March 7, 1944.  L. ROSEMAN  2,343,708
CLAMPING DEVICE FOR FLEXIBLE CONNECTORS
Filed Aug. 20, 1942  4 Sheets-Sheet 1
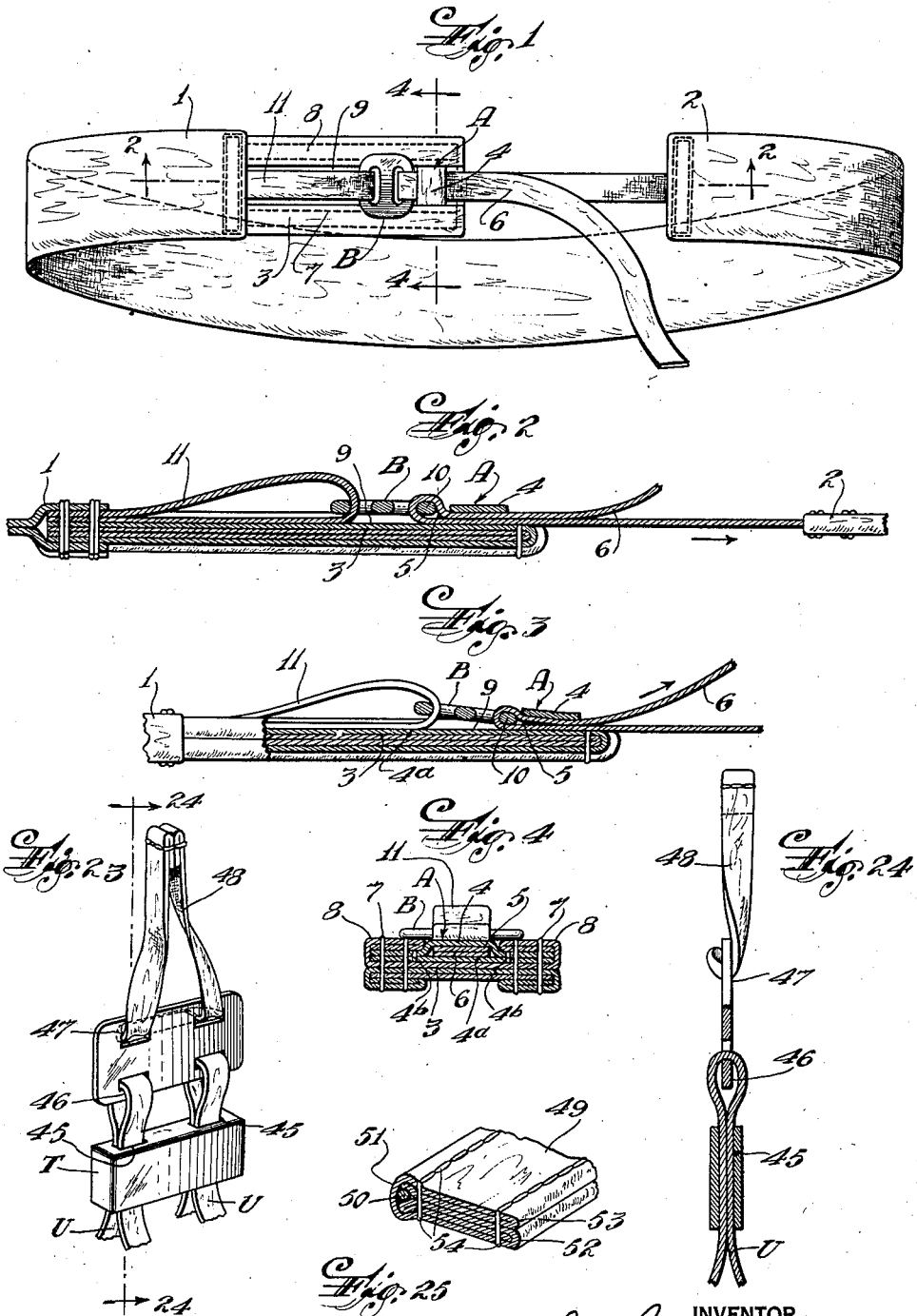
INVENTOR
Leo Roseman,
BY Harry B. Rook,
ATTORNEY March 7, 1944. L. ROSEMAN 2,343,708
CLAMPING DEVICE FOR FLEXIBLE CONNECTORS
Filed Aug. 20, 1942 4 Sheets-Sheet 2

INVENTOR
Leo Roseman,
BY
Harry B. Cook,
ATTORNEY

March 7, 1944. L. ROSEMAN 2,343,708
CLAMPING DEVICE FOR FLEXIBLE CONNECTORS
Filed Aug. 20, 1942 4 Sheets-Sheet 3

INVENTOR
Leo Roseman
BY
Harry I. Cook
ATTORNEY

March 7, 1944. L. ROSEMAN 2,343,708
CLAMPING DEVICE FOR FLEXIBLE CONNECTORS
Filed Aug. 20, 1942 4 Sheets-Sheet 4
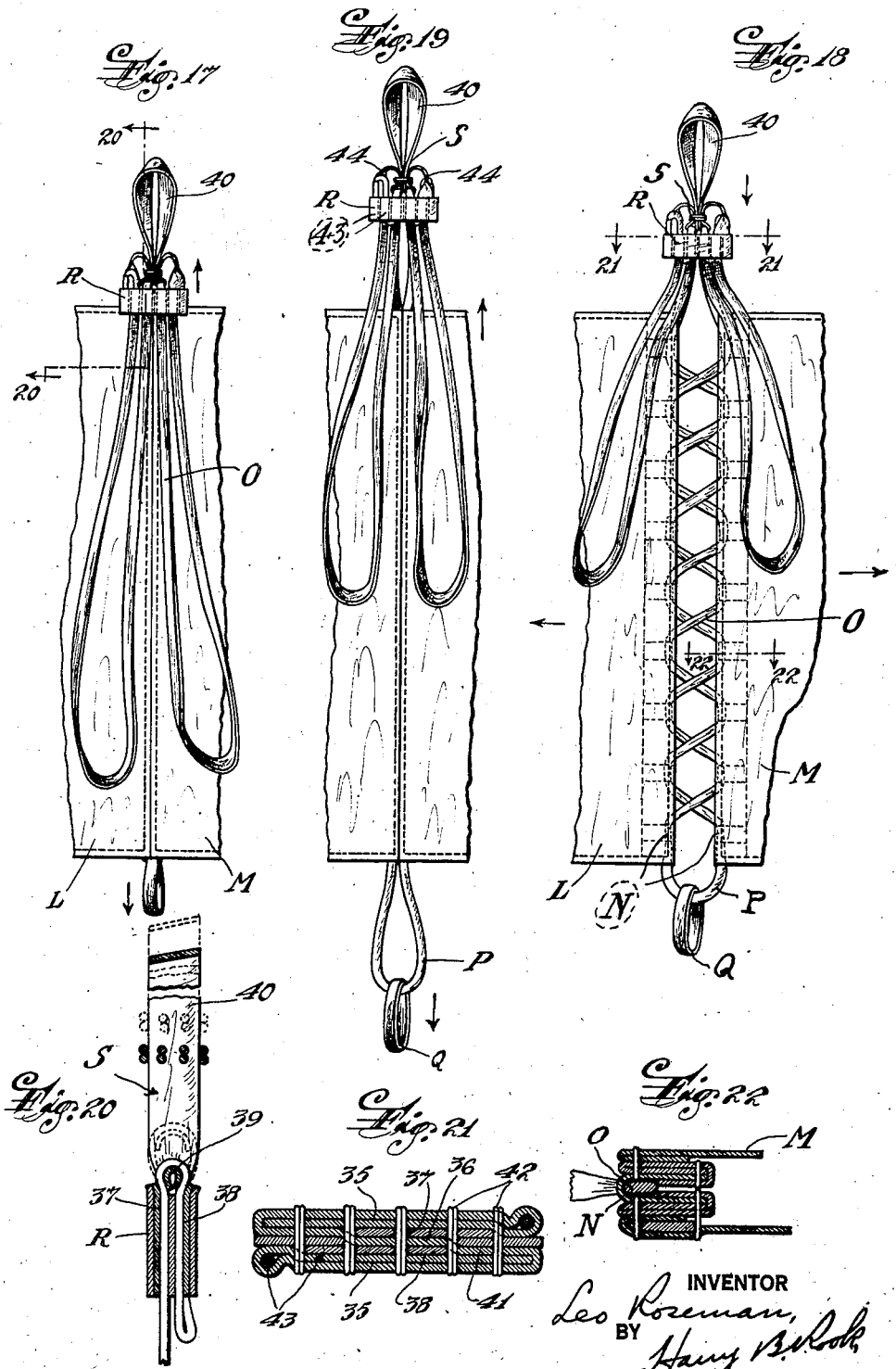
INVENTOR
Leo Roseman,
BY
Harry B. Cook
ATTORNEY Patented Mar. 7, 1944

2,343,708

UNITED STATES PATENT OFFICE 2,343,708

CLAMPING DEVICE FOR FLEXIBLE CONNECTORS

Leo Roseman, Newark, N. J.

Application August 20, 1942, Serial No. 455,446

18 Claims. (Cl. 24—266)

This invention relates in general to devices for releasably clamping or holding flexible connectors such as laces, cords, straps, belts and tapes that may be used, for example, in closures or fasteners for brassières or bandeaus, corsets, surgical bandages and belts, shoulder straps, garters, luggage or bundle-ties, or in auxiliary fasteners for garments to facilitate operation of "Zipper" closures, whereby the laces, cords, etc., can be easily and quickly clamped, gripped or held in adjusted positions and released at will.

To avoid circumlocution hereinafter, the term "strap" will be used to include cords, laces, belts, tapes and other narrow strips of flexible material of the order of fabric and leather.

Known clamps, holders, clasps or locks of this character are not satisfactory because either they do not reliably hold the laces, etc., or they are too slow in closing and opening, or they are too complicated or expensive, or they are too large or bulky and produce objectionable hard protuberances especially when used on closures of undergarments such as corsets or brassières. Furthermore, such devices have been made of metal and, due to the restrictions on the use of metals presently in force as a consequence of the war, it is practically impossible to obtain metals for the manufacture of such devices.

Therefore, one object of the invention is to provide a novel and improved strap-clamping device to be attached to one of two parts to be connected and to cooperate with a strap having one end portion secured to the other of said parts and its other end portion slidably threaded through and returned upon itself in said clamping device so that the strap may be pulled freely through the device in either of opposite directions and at the will of the operator shall automatically clamp and hold the strap against sliding through the device in at least one direction, whereby the device may serve in the nature of a clamp, for example, for a strap in a garment closure, surgical belt, bundle-tie, etc., and the device shall be simple, inexpensive, compact and reliable.

Further objects are to provide a device of the character described which shall permit said strap to be drawn in one direction freely through said device by tension in opposite directions upon the strap and said part to which the device is attached so as to, for example, adjust a garment closure of which the clamping device is a part, after which upon release of said tension at any adjusted position the device shall automatically lock said strap against sliding in the opposite direction and thereby hold the strap in adjusted position; and to provide such a device which will permit release of said strap by a simple manipulation of the device.

Another object is to provide a strap-clamping device which can be manufactured wholly of fabric, or partially of fabric and metal, plastic material or fiber, depending upon the use to which the device is to be applied.

Other objects, advantages and results of the invention will be brought out by the following description in conjunction with the accompanying drawings in which:

Figure 1 is a plan view of one embodiment of the invention, showing the tape released.

Figure 2 is a longitudinal vertical sectional view on the line 2—2 of Figure 1.

Figure 3 is a similar view, showing the cord clamped against longitudinal movement in one direction.

Figure 4 is a transverse vertical sectional view on the line 4—4 of Figure 1.

Figure 17 is an elevational view of the two edge portions of the garment connected by lacings having a lace clamp, in accordance with my invention, the lacing and clamp being shown in adjusted or tightened position.

Figure 18 is a similar view showing the lacing loosened.

Figure 19 is a similar view showing an intermediate operation in the loosening of the lacing.

Figure 20 is an enlarged fragmentary vertical sectional view on the line 20—20 of Figure 17.

Figure 21 is a horizontal sectional view on the line 21—21 of Figure 18.

Figure 22 is an enlarged transverse vertical sectional view on the line 22—22 of Figure 18.

Figure 23 is a perspective view showing a modification of the clamping device illustrated in Figures 17 to 21.

Figure 24 is a transverse vertical sectional view on the line 24—24 of Figure 23, and Figure 25 is a sectional perspective view of a modified form of guide strip.

Figure 5:
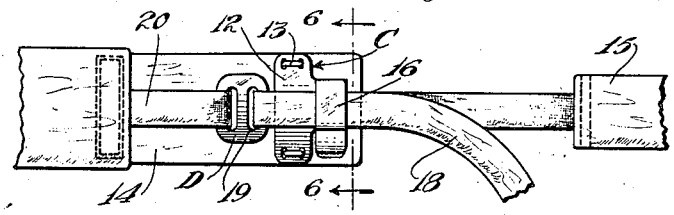
Figure 5 is a view similar to Figure 1, showing a modification of my invention.

For the purpose of illustrating the now preferred embodiment of my invention, I have shown it in Figures 1 to 4, inclusive, in conjunction with two parts to be connected which may be, for example, the ends 1 and 2 of a brassière or bandeau, or a band for a bundle-tie as shown. The lace or cord clamp includes a body part 3 preferably of flexible material such as fabric, which may constitute or may be secured to one of the ends 1 and 2 of the brassière. A strip 4 of fabric, metal or other suitable material is secured to the body part with its intermediate portion spaced from the body part to form a guide A which has a guideway 5 between the strip and the body part for the lace or cord 6.

As shown, the strip 4 is fabric and is secured to a piece of fabric 4a which in turn is secured to the body part by stitches 7. Preferably, tying stitches 4b are utilized for firmly securing the strip 4 to the piece 4a, and the longitudinal edge portions of the body part 3 are turned inwardly at 8 to form a channel or groove 9 between them, and the ends of the strip 4 and the piece 4a are secured between the main portion and said inturned edge portions of the body part to conceal and to prevent fraying the ends of the strip. It is desirable that the lace or cord lie in said channel.

The strip 4 and the body part at the base of the channel thus form walls for the guideway, and the end of the wall formed by the strip 4 is disposed above the body part.

Cooperating with the guide is a gripper B preferably comprising a plate formed of rigid material such as fiber, wood or metal and having a rigid preferably straight bar portion 10 which conveniently constitutes one side of an opening through the plate. It is desirable that the gripper bar 10 extend across the channel 9 and contact with the body part at opposite sides of the channel.

One end of the strap is threaded in one direction through said guideway 5. The strap is then doubled upon itself and passes in a loop around the bar 10 and thence is threaded through the guideway in the other direction, so that said gripper overlies the body part and is adapted to abut said strip 4 at one end of said guideway. The end portion of the strap that is adjacent the body part; i. e., the undermost portion, is connected to the one of the parts 1 and 2 opposite that to which said guide A is attached.

In operation of the device, by exerting a pull upon the free or uppermost end portion of the strap, tending to draw the latter through the guide, the strap may be freely slid longitudinally through the guideway so as to draw the two ends 1 and 2 of the band together. During this operation the gripper bar 10 will be slightly pushed rearwardly and downwardly away from the intermediate portion of the strip 4 so that the strap cannot be gripped between the gripper and the strip 4. The body part 3 underlying the gripper bar 10 is flat and devoid of abutments such as the strip 4 so that the strap will also freely slide between the gripper bar and the body part as shown in Figure 3. Upon relaxation of said pull on the tape, the tension imposed by the tightened band upon the portion of the strap that connects the two ends 1 and 2, will draw the gripper bar 10 upwardly toward the adjacent edge of the guide strip 4, as shown in Figure 2, so as to firmly frictionally grip the strap between the gripper bar and said strip and prevent sliding of the strap through the guide in the other direction. To loosen the band or to release the strap, it is merely necesary to exert a pull on the gripper B in the direction opposite that of the tension on the portion of the strap between said gripper and the end of the band opposite that to which the gripper is attached. Such manipulation of the gripper is faciilitated by a finger tape 11 attached to the gripper and also preferably secured to the body part 3 so that the gripper may have limited movement in all directions relative to the guide strip 4.

Figure 6:
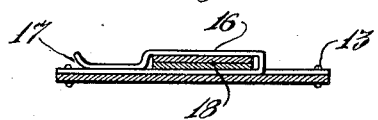
Figure 6 is a transverse vertical sectional view on the line 6—6 of Figure 5.

Figures 5 and 6 illustrate another form of the invention wherein the guide C of the clamping device is formed of rigid material such as metal and includes a plate 12 secured as by stitches 13 to one of the two parts 14 and 15 to be connected. The plate has an integral guideway 16 formed with a lateral opening 17 through which the strap 18 may be inserted laterally into the guideway instead of being threaded lengthwise therethrough. The strap is threaded through an opening 19 in the gripper D which is like the gripper B, and a pull-tape 20, like the tape 11, is connected to the gripper. The operation of this form of the invention is identical with that of Figures 1 to 4, inclusive, except that the strap can be easily and quickly inserted into and removed from the guideway through the opening 17.

Figure 7:
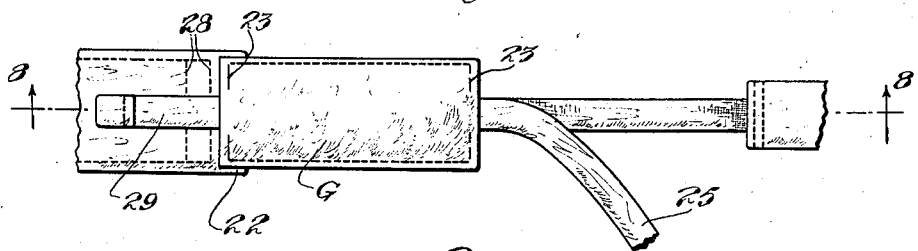
Figure 7 is a plan view of another form of the invention.
Figure 8:
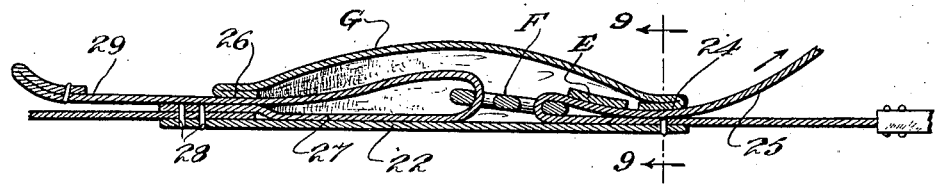
Figure 8 is an enlarged longitudinal vertical sectional view on the line 8—8 of Figure 7.
Figure 9:
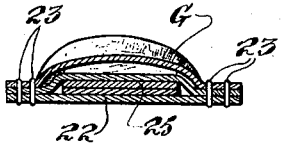
Figure 9 is a transverse vertical sectional view on the line 9—9 of Figure 8.
Figure 10:
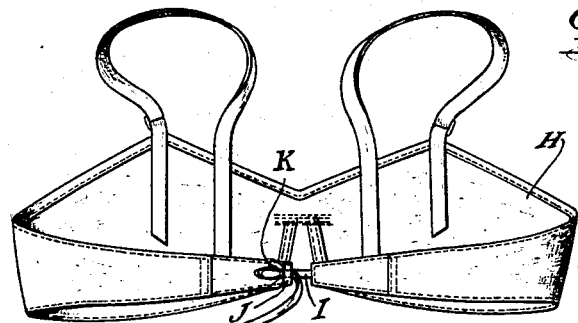
Figure 10 is an elevational view of another form of fastener embodying my invention, showing it applied to a brassière.
Figure 11:
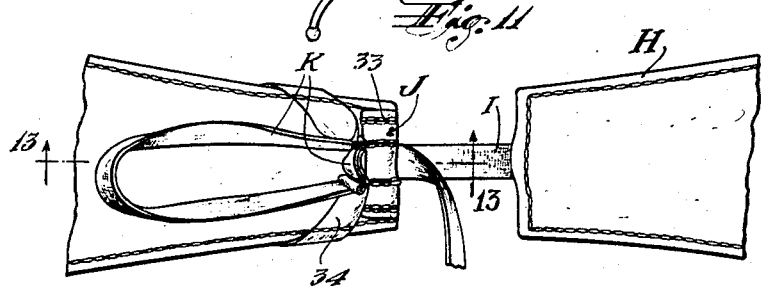
Figure 11 is an enlarged fragmentary elevational view of the fastener showing it in adjusted or tightened position.
Figure 12:
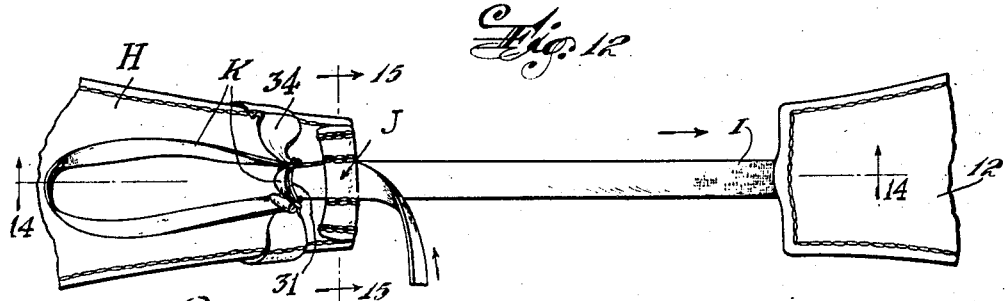
Figure 12 is a similar view showing the fastener loosened.
Figure 13:
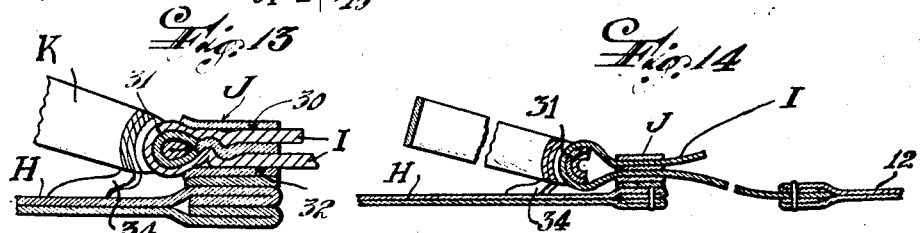
Figure 13 is an enlarged fragmentary vertical sectional view on the line 13—13 of Figure 11.
Figure 14:
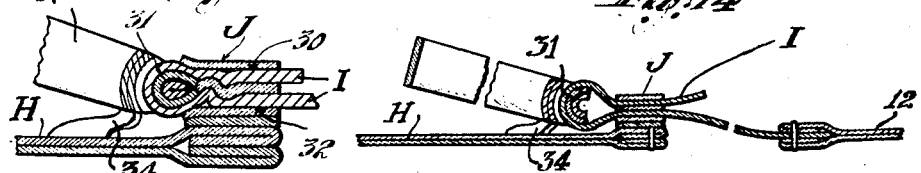
Figure 14 is a similar view on the line 14—14 of Figure 12.
Figure 15:
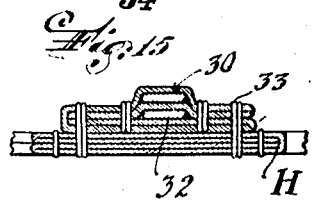
Figure 15 is a transverse vertical sectional view on the line 15—15 of Figure 12.
Figure 16:
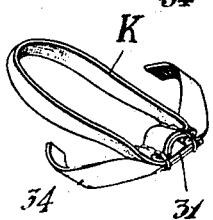
Figure 16 is a detached perspective view of a portion of the lace or cord gripper.

In Figures 7 to 9 is illustrated a modification of the invention which really constitutes the form of Figures 1 to 4, inclusive, with a cover added to conceal the guide and the gripper. The part 22, which is one of the two parts to be connected, has connected thereto the guide E like the guide A, and the gripper F like the gripper B; and a flexible cover G overlies said guide and said gripper and has its ends connected as by stitching 23 to the part 22. A gap 24 is provided between the part 22 and the cover for passage of the strap 25, and a similar gap 26 is provided for the pull-tape 27, one end of which is fastened at 28 to the part 22, while the other end 29 is slidably threaded through said gap 26 and projects beyond the cover G for manipulation. Obviously, a pull on the end 29 of the pull-tape will draw the gripper away from the guide.

In all forms of the invention so far described, it will be noted that the body parts, for example, the parts 3 and 14, form extensions at the ends of the respective guides A and C which serve as supports and abutments for the grippers B and D so that the grippers will clamp the straps when tension is exerted on the undermost ends of the straps as shown in Figure 3 and the grippers will be prevented from clamping the straps when the uppermost ends of the straps are subjected to tension as shown in Figure 2.

Preferably the gripper bars are polygonal or irregular in cross-section to increase the frictional contacts between them and the straps, and of course the grippers should be so constructed that the gripper bars cannot rotate through a complete revolution when the straps slide through the guides.

With these devices, adjustments can be easily and quickly made, and where the clamping device is attached for example to a garment, the strap can be tightened easily and quickly with one hand by pulling on the uppermost portion of the strap. Also, the strap can be released or unclamped with one hand by a simple pull on the gripper or the finger tape 11, 20 or 29.

In Figures 10 to 16, inclusive, I have shown the invention embodied in a fastener which for the purpose of illustrating one use, is shown in conjunction with a brassière H.

The fastener includes a strap I, one end of which is connected to one of the parts to be fastened together, specifically one end of the brassière, while the other end portion is threaded in one direction through a guideway 30 of a guide J like the guide A, then through a loop 31 of a gripper K, and then in the other direction through a guideway 32 in the guide J. The guide J is secured to the other part to be connected, specifically the other end of the brassière H, as by stitches 33, and the gripper K is connected to the brassière as by flexible connectors 34 so that the loop 31 may have limited relative movement in all directions with respect to the guide J.

In the operation of this form of the invention, to tighten or close the fastener, specifically to draw the ends of the brassière together, the gripper K is gripped in one hand and the free end of the strap I is gripped in the other hand, whereupon pulls in opposite directions are exerted on the gripper and the strap. Upon release of the gripper K, the loop 31 will be drawn into contact with the guide by the tension on the strap I so that the latter will be tightly clamped between the loop and the walls of the guide. To release the fastener, it is merely necessary to exert pulls in opposite directions on the gripper K and the end of the brassière opposite that to which the clamp is attached, this operation pulling the loop 31 out of contact with the guide to permit free sliding of the strap through the guide. With this form of the invention, the gripper may clamp the strap at both sides of the guideways so as to prevent sliding of the strap through the guide in both directions.

Referring particularly to Figures 17 to 22, inclusive, I have shown the invention in a lacing for connecting two parts L and M, such as the edge portions of a garment, particularly a girdle. Along the adjacent edges of the parts L and M are secured lacing eyes N through which are threaded a lace O whose free ends are disposed in juxtaposed relation at the upper end of the parts L and M. The lace is so threaded through the lacing eyes that a loop P is formed at the lower edges of the parts L and M and a pull-tab Q is attached to this loop for a purpose to be described. The free ends of the lace are threaded through the lace-clamping device which includes a body part and guide R and a gripper S. The guide has two outer walls 35 and an intermediate wall 36 which form between them two closely spaced parallel tubular guideways 37 and 38 for each end portion of the lace D.

The gripper S includes a loop 39 for each end portion of the lace, and a finger piece 40 for manipulating the loops.

Each end portion of the lace is threaded in one direction through one of the corresponding guideways 37 or 38, then through the corresponding loop 39 of the clamp, and then in the other direction through the other guideway 37 or 38. With this construction when tension is exerted on the lace end portion at the side of the guide opposite the gripper, the corresponding gripper loop will be drawn into contact with the guide at the upper end of the guideways.

In accordance with the invention the walls of the guide, and the loop are formed to frictionally clamp the lace end portion between them when the loop is drawn into contact with the guide as described. More particularly, either or both the walls of the guide and the gripper loops are deformable by pressure exerted on the guide as the gripper is drawn into contact with the guide, and preferably both the walls of the guide and the loops of the clamp are formed of soft, friction-producing material such as fabric. It is also desirable that the lace O be formed of deformable and friction-producing material such as fabric.

The guide may be formed in any suitable manner, but as shown more particularly in Figures 20 and 21, the guide comprises a single strip of fabric, for example braid or tape, having its end portions folded inwardly as at 41 to form the outer walls 35 of double thickness, after which the piece is folded to form the intermediate wall 36 of a single thickness; and all of the walls are firmly secured together by transverse stitches 42 so as to provide the guideways 37 and 38 each of which is of a size to snugly slidably receive the lace.

To hold the ends of the laces in an out-of-the-way position and to prevent them from becoming entangled, the guide may have two auxiliary openings 43 for each lace end through which the extremity of the lace may be threaded.

In operation of the lacing and clamp so far described, the end portions of the laces between the guide and the parts L and M are pulled in the usual manner to tighten the lacings, after which the finger piece 40 of the gripper is gripped in one hand and the end portions of the lace at the other side of the guide are pulled to draw the guide against the parts L and M and the gripper loops against the guide as shown in Figure 17. When movement of the guide is stopped by contact thereof with the parts L and M, further pulls on the lace ends will cause the lace to be frictionally clamped between the loops and the guide as shown in Figure 20, so that the lace cannot slide through the guide in either direction.

Each loop 39 is deformed and wedged between the portions of the lace in the guideways and compresses them between the loop and the side walls 35 of the guide. To loosen the lacing the finger tab Q is grasped in one hand and the finger piece 40 of the gripper in the other, after which pulls in opposite directions are exerted on the finger tab and the finger piece. This will cause the gripper to move away from the guide so as to release the lace, and continued pulling will slide the free portions of the lace through the guide.

It is desirable that the gripper have a lost motion connection with the guide R so that after the lace has been released the guide will be slid along the lace with the clamp. As shown, the clamp is connected to the guide by flexible connectors 44 so that the clamp may have limited movement relatively to the guide.

Thereafter the upper edges of the parts L and M are grasped in one hand and the tab O is gripped in the other, whereupon pulls in opposite directions are exerted to slide the lace through the lacing eyes as shown in Figure 19. It is then possible to separate the parts L and M by pulls thereon in opposite directions as indicated by the arrows in Figure 18.

While I have shown the guide as formed with two guideways 37 and 38 for each lace end portion, only a single guideway is necessary if a rigid gripper bar is also utilized, as shown in Figures 23 and 24. Here the guide T has a single guideway 45 for each lace end portion and the lace U is threaded in one direction through said guideway, then passed in a loop around the gripper bar 46 of a gripper 47 and then is threaded in the opposite direction through the guideway, so that in effect the lace is looped upon itself and the portions of the lace at opposite sides of the loop directly contact with each other in the guideway. A pull-tape or finger piece 48 having the same purpose as the finger piece 40 may be provided. The operation of the device otherwise is the same as hereinbefore described.

In some cases it may be desirable to reenforce the edge of the guide against which the strap is clamped by the gripper. As shown in Figure 25, the strip 49 that corresponds, for example, to the strip 4, is reenforced by a cord or the like 50. The strip is shown as consisting of a single piece of fabric or the like folded upon itself at 51 and having the cord arranged within said fold, the edge portions of the piece being folded inwardly as at 52 and 53 along lines parallel to the fold 51 to form a plurality of plies of material. These plies are secured together by lines of stitches 54, one of said lines preferably being disposed at the side of the cord 50 opposite the fold 51. In use, the strip 49 will be mounted with the reenforced folded edge 51 arranged to be abutted by the gripper.

If desired, a plurality of straps and cooperating clamping devices like those of Figures 1 to 4 could be utilized cooperatively; for example, they could be secured in spaced relation along the edges of a garment opening to operate individually but to cooperate in fastening said edges together. For simultaneous manipulation of the devices, the free ends of all of the straps like the strap 6 could be connected together so as to be pulled at the same time to tighten the closure, and all of the pull-tapes like the tape 11 or 29 could be connected together so that all grippers could be released at the same time by one pull.

Many other uses of my invention and modifications and changes in details of construction can be made within the spirit and scope of the appended claims.

The term "guide" as used in the appended claims is intended to include any of the guides A, C, J, R and T, and particularly a guide having either one guideway such as guides A and T, or a guide having a plurality of guideways like the guides R and J.

What I claim is:

1. The combination with a strap, of a clamping device including a guide having a tubular guideway, and a gripper free for limited movement in all directions relative to said guide, said strap extending longitudinally in one direction through said guide, passing in a loop over said gripper and then extending in the opposite direction through said guide so that said gripper is located and held by said loop adjacent one end of said guideway, said gripper and said guide being formed to frictionally clamp said strap between them when said gripper is drawn toward the guide by tension upon the portion of said strap at one side of said loop.

2. A strap-clamping device comprising a body part including walls forming a tubular guide, and a gripper connected to said body part for limited movement in all directions relative to said body part to cooperate with one end of said guide so that a strap may be threaded in one direction through said guide, then passed in a loop around said gripper and then threaded in the opposite direction through said guide, whereby the gripper will be drawn across one end of said guide and said strap will be frictionally clamped between said gripper and one wall of said guide, when tension is exerted on the portion of said strap at one side of said loop.

3. The strap-clamping device set forth in claim 2 wherein said gripper is a rigid plate having an opening therethrough which forms a rigid gripper bar, and said strap is looped through said opening around said bar.

4. The combination set forth in claim 1 wherein said gripper is a rigid plate having an opening therethrough which forms a rigid gripper bar, and said strap is looped through said opening around said bar.

5. A fastener including a strap to be secured to one of two parts to be connected together, and a clamping device to be attached to the other of said parts and including a guide having walls forming a tubular guideway through which said strap may slide, and a gripper comprising a plate having a gripper bar to cooperate with said guide for clamping said strap therebetween, said strap extending in one direction through said guide, then passing in a loop around said gripper bar and then extending in the opposite direction through said guide, there being an extension at one end of one of the walls of said guide forming a support and abutment for said gripper plate so that tension on the undermost portion of said strap which tends to pull the strap through said guide will draw said gripper bar upwardly and toward said end of the guide, and said extension will underlie said gripper, whereby said strap will be clamped between said bar and said guide, while upon application of tension on the uppermost portion of the strap tending to pull the strap through the guide, said gripper bar will be drawn downwardly away from said end of the guide toward said extension and the latter will prevent clamping of the strap to thereby permit the strap to be pulled freely through said guide.

6. The combination with a strap, of a clamping device including a body part having a guide thereon comprising walls forming a guideway, the ends of certain walls of said guideway at one end of the guide projecting above said part and a portion of said body part extending outwardly beyond said end of the guide, and a gripper overlying said body part adjacent said end of the guide and including a rigid bar to abut said ends of the walls of the guideway, said strap extending in one direction through said guideway, then passing in a loop over said bar and then extending in the opposite direction through said guideway, so that tension on the undermost portion of said strap tending to pull the strap through said guide will draw said bar upwardly and toward the ends of the upper walls of the guideway so as to clamp said strap between them, while upon application of tension on the uppermost portion of the strap, tending to pull the strap through said guide, said gripper bar will be drawn downwardly away from the upper walls of said guide and prevented by contact with said body part from clamping said strap, thereby to permit the strap to be freely pulled through said guide.

7. The combination set forth in claim 6 wherein said body part is formed of fabric so as to be flexible under tension on said strap.

8. The combination set forth in claim 6 with the addition of manually operable means for pulling said gripper away from said guide to prevent clamping of said strap or to release the strap after it has been clamped.

9. The combination set forth in claim 6 wherein said body part has a channel leading from said guideway beneath said gripper and said gripper bar extends across said channel and contacts with said body part at opposite sides of the channel.

10. The combination with a strap, of a clamping device including a fabric piece having its longitudinal edge portions folded inwardly to form a channel between them, a strip of material extending across said channel and having its end portions secured between the main portion of said fabric piece and said inturned edge portions to form a guideway between said strip and said piece, said piece extending outwardly beyond one end of said guideway, and a gripper overlying said fabric piece at said end of the guideway and having an opening therethrough one side of which comprises a rigid bar extending across said channel, said strap passing in one direction through said guideway, then passing in a loop through said opening in said gripper and around said rigid bar and then extendinng in the opposite direction through said guideway.

11. The device set forth in claim 2 with the addition of means for pulling said gripper out of contact with said guide to release said strap.

12. In a lacing, the combination with two parts to be laced together, each having lacing eyes, and a lacing threaded through said eyes and having two juxtaposed lace end portions at one end of the lacing, of a lace clamp comprising a guide having walls forming two pairs of guideways each pair including two closely spaced parallel guideways, and a gripper having two loops, one lace end portion being threaded through the guideways of each pair and through one of said loops, said end portion passing in one direction through one guideway, then through the corresponding loop and then in the other direction through the other guideway of said pair, the walls of the guide and said loops being formed to frictionally clamp the respective lace ends between them when said loops are drawn into contact with the guide at one end of the guideways by a pull on said lace end portions, whereby to hold said lace end portions against sliding through said guideway in either direction.

13. A fastener for two parts to be connected, comprising a strap connected at one end to one of said parts, a guide for said strap connected to the other of said parts and including walls forming two closely spaced parallel guideways, and a gripper having a loop, said strap being threaded in one direction through one guideway, then through said loop and then in the other direction through the other guideway, said walls of the guide and said loop being formed to clamp said strap between them when said loop is drawn in contact with the guide at one end of said guideways by tension on said strap, whereby to hold said strap against sliding through said guideways in either direction.

14. The fastener set forth in claim 13 with the addition of means for pulling said loop out of contact with said guide to release said strap and wherein said means is connected to the second-mentioned of said parts for limited movement relatively thereto.

15. The lace clamp set forth in claim 12 with the addition of means for simultaneously pulling both said loops out of contact with said guide to release said lace end portions.

16. The lace clamp set forth in claim 1 with the addition of means for pulling said gripper out of contact with said guide to release said strap, said means being connected to said guide for limited movement relatively thereto.

17. A strap clamping device comprising a strap guide having a body piece of flexible material whose longitudinal marginal edge portions are folded inwardly, a guide strip of flexible material extending transversely of said body piece with its end portions secured between said inwardly folded marginal portions and the main portion of said body piece, and a gripper to cooperate with one end of said guide so that a strap may be threaded in one direction through said guideway, then passed in a loop around said gripper and then threaded in the opposite direction through said guideway, whereby said strap will be frictionally clamped between said gripper and said end of the guide when tension is exerted on the portion of said strap at one side of said loop, and a pull-tape connected to said gripper and to said body part to permit limited movement of said gripper relatively to said guide for pulling said gripper out of contact with the guide.

18. The strap clamping device set forth in claim 17 wherein said gripper is a rigid plate having an opening therethrough which forms a rigid gripper bar around which a strap may be looped through said opening, and said plate has another opening through which said pull-tape is threaded.

LEO ROSEMAN.